Figure 1:
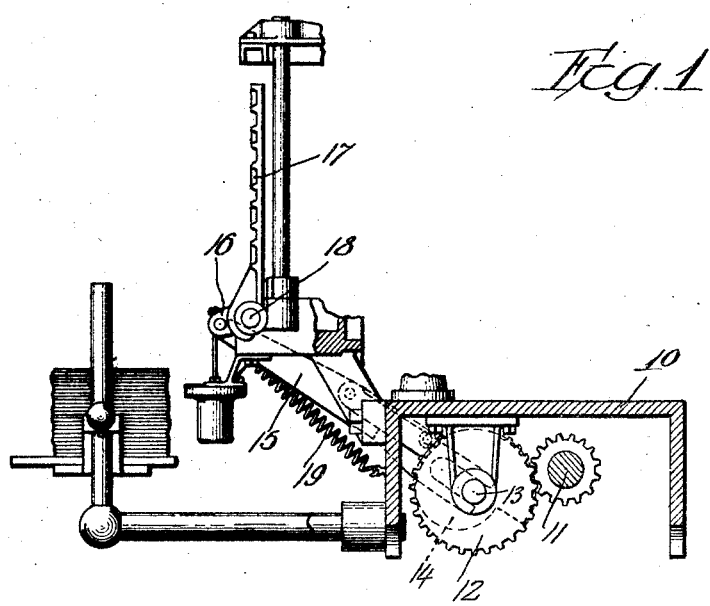

Feb. 23, 1926.

C. F. M. VAN BERKEL 1,573,952

SLICING MACHINE

Filed May 15, 1924

Inventor:
C. F. M. van Berkel
Nissen & Crane Attys.

Patented Feb. 23, 1926.

1,573,952

UNITED STATES PATENT OFFICE.

CORNELIS FRANCISCUS MARIA van BERKEL, OF ROTTERDAM, NETHERLANDS, ASSIGNOR TO U. S. SLICING MACHINE COMPANY, OF LA PORTE, INDIANA, A CORPORATION OF INDIANA.

SLICING MACHINE.

Application filed May 15, 1924. Serial No. 713,394.

*To all whom it may concern:*

Be it known that I, CORNELIS F. M. VAN BERKEL, a subject of the Queen of the Netherlands, residing at Rotterdam, Netherlands, have invented certain new and useful Improvements in Slicing Machines, of which the following is a specification.

This invention relates to slicing machines having attachments for depositing slices in stacked formation and has for its object the provision of improved mechanism for this purpose which shall include means for controlling the operation of the stacking element.

The invention is exemplified in the combination and arrangement of parts shown in the drawing and described in the following specification, and it is more particularly pointed out in the appended claims.

In the drawing—

Figure 2:
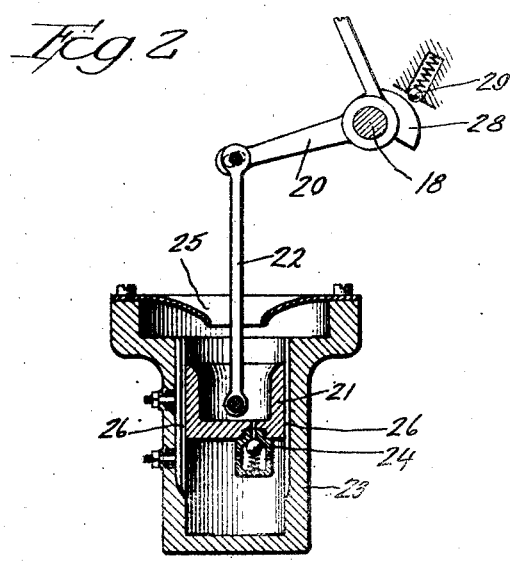

Fig. 1 is a fragmentary elevation, partly in section, showing one embodiment of the invention; and Fig. 2 is a vertical sectional view showing the dash-pot and brake cam for controlling the action of the slice depositing fly.

As illustrated in the drawing, the invention is shown as applied to a stacker for meat slicers such as that described in my previous Patent No. 1,290,425, granted January 7, 1919, but it will be understood that the invention is also applicable to other forms of meat stackers.

The numeral 10 on the drawing designates the main frame of a slicing machine having a main drive shaft 11 which meshes with a gear 12 secured to a counter-shaft 13. A cam 14 is mounted on the shaft 13 and operates a reciprocating bar 15 pivotally connected with an arm 16 secured to the fly 17 so as to operate the fly 17 about its pivot 18 in the manner described in the patent referred to. A spring 19 is connected with the fly shaft 18 so as to move the fly in a counter-clockwise direction to discharge the slices when the bar 15 is released by the cam 14.

The pivot shaft 18 for the fly 17, as shown more clearly in Fig. 2, is provided with an arm 20 to which is connected a piston 21 by means of a connecting rod 22 which piston slides in an air or oil chamber 23. The piston 21 is provided with a one-way valve 24 and a guard or cover 25 to prevent escape of oil in case it is used for the controlling medium. When the piston 21 is on its downward stroke the air or oil under the piston escapes through the passages 26. These passages may be shaped so that the cross-sectional areas decrease from the top to the bottom and by which arrangement during the downward movement of the piston the air or oil escapes freely at the beginning of the stroke and is more restricted after the piston has reached its lower position so that the movement of the discharge member 17 is more retarded at the completion of its stroke.

In some cases where air is used for the controlling medium for the dash-pot there is a tendency for the fly to rebound at the end of its stroke due to the compression of the air in the piston. This tendency may be overcome by the use of a brake mechanism such as a cam 28 secured to the shaft 18 and arranged to engage a friction ball 29 at the time that the fly reaches the downward portion of its stroke. If desired, the grooves 26 in the walls of the cylinder 23 may be provided with throttling strips 30, as shown at the left in Fig. 2, in order to regulate the size of the opening and control the retarding action of the dash-pot.

I claim:—

1. In combination, a discharge fly of a slice stacking machine, and a cushioning device for controlling the movement of said fly, said cushioning device being arranged to exert retarding force on said fly prior to the time in its discharge movement when it reaches discharge position.

2. The combination with a discharge fly of a slice stacking machine, of a dash-pot connected with said fly for cushioinng the movement of said fly during its discharge operation.

3. The combination with a discharge fly, of a slice stacking machine, of a dash-pot connected with said fly for controlling the movement of said fly during discharge operation thereof, and brake means for preventing rebound of said fly.

4. In a slicing machine, the combination of a slide discharge device, means for releasing said device to permit discharge operation thereof, and a dash-pot for controlling said discharge operation.

5. In a slicing machine, a reciprocating slice discharge device, means for releasing said device at a predetermined period in the operation of said machine to permit discharge operation of said device, a dash-pot for arresting the discharge operation of said device, and brake means for preventing rebound of said device.

6. In a slicing machine, a pivoted discharge fly for slicers, a spring for actuating said fly, cam mechanism for returning said fly after an operation thereof and for releasing said fly at a predetermined period in the operation of said machine, a dash-pot for arresting the discharge movement of said fly at the end of the operation thereof, and a cam arranged to engage a brake at the end of the discharge operation of said fly to prevent rebound of said fly.

7. In combination, a discharge fly of a slice stacking machine, and a cushioning device for controlling the movement of said fly, said device being arranged to exert a gradually increasing retarding force on said fly as said fly approaches discharge position.

8. In combination, a discharge fly of a slice stacking machine, and a dashpot for controlling the movement of said fly, said dashpot being arranged to exert a gradually increasing retarding force on said fly as said fly approaches discharge position.

9. In combination, a discharge fly for a slice stacking machine, means for operating said fly to perform a discharging operation, and means for preventing rebound of said fly at the close of a discharge operation.

10. In combination, a discharge fly for a slice stacking machine, and a brake for preventing rebound of said fly at the close of a discharge operation.

11. In combination, a discharge fly for a slicing machine, a cushioning device arranged to exert a gradually increasing retarding force on said fly as said fly approaches discharge position, and a brake for preventing rebound of said fly.

12. In combination, a discharge fly for a slicing machine, a cushioning device for controlling the movement of said fly, said cushioning device being arranged to exert a gradually increasing retarding force on said fly as said fly approaches discharge position, and a spring for actuating said fly during its discharge operation.

13. In combination, a discharge fly for a slice stacking machine, and means for retarding the movement of said fly before it reaches its discharge position during a slice discharging operation.

In testimony whereof I have signed my name to this specification on this sixteenth day of April, 1924.

CORNELIS FRANCISCUS MARIA van BERKEL.